Sept. 30, 1958 F. J. WINCHELL 2,854,300
TRANSMISSION

Filed May 21, 1956 2 Sheets-Sheet 1

INVENTOR.
Frank J. Winchell
BY
T. L. Chisholm
ATTORNEY

Sept. 30, 1958 F. J. WINCHELL 2,854,300
TRANSMISSION
Filed May 21, 1956 2 Sheets-Sheet 2
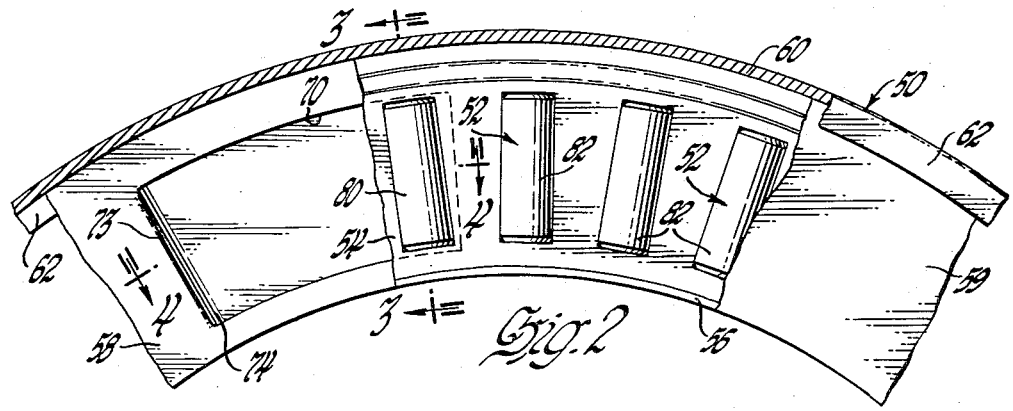
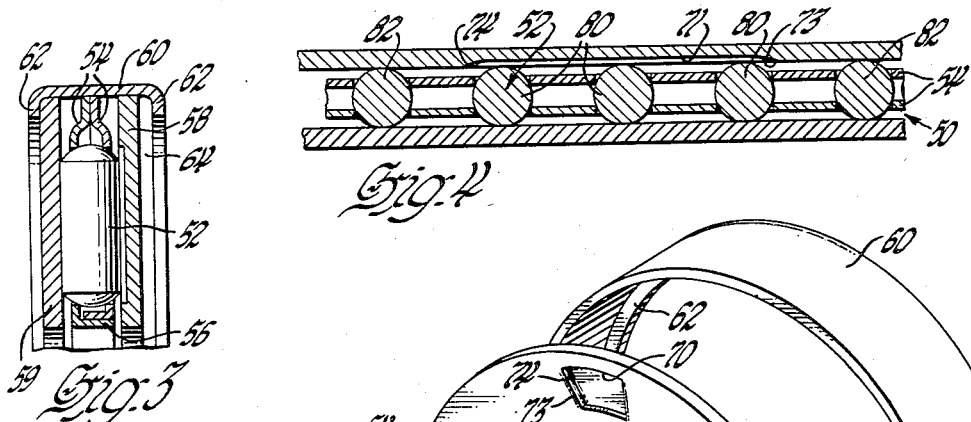
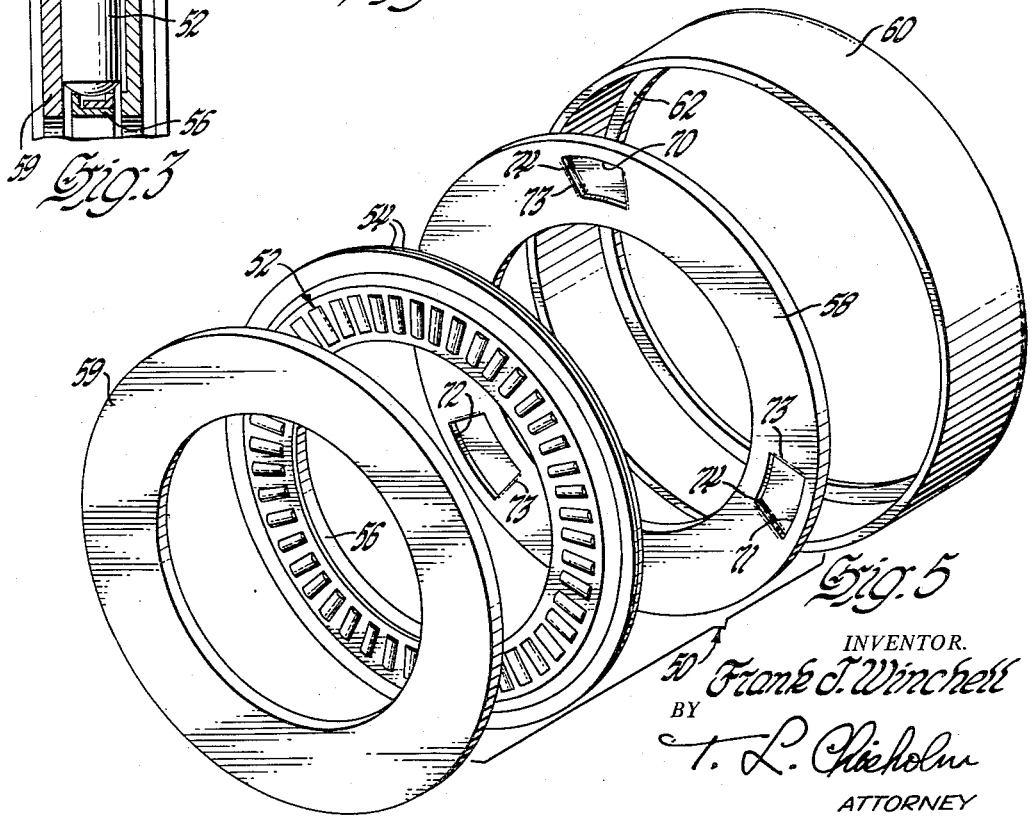
INVENTOR.
Frank J. Winchell
BY
T. L. Chisholm
ATTORNEY United States Patent Office 2,854,300
Patented Sept. 30, 1958

2,854,300

TRANSMISSION

Frank J. Winchell, Franklin Village, Mich., assignor to General Motors Corporation, Detroit, Mich., a corporation of Delaware Application May 21, 1956, Serial No. 586,116

2 Claims. (Cl. 308—235)

This invention relates to transmissions, particularly to hydrodynamic torque transmitting means (for example torque converters) equipped with a novel thrust bearing and to the construction of the bearing itself.

In the accompanying drawings—

Fig. 2 is an enlarged section on the line 2—2 of Fig. 1 showing partly in elevation and partly broken away one form of thrust bearing embodying the invention;

Fig. 3 is a section on the line 3—3 of Fig. 2;

Fig. 4 is a section on the line 4—4 of Fig. 2; and

Fig. 5 is an exploded perspective of the parts of the bearing before the last-forming operation on the retaining cap.

Figure 1:
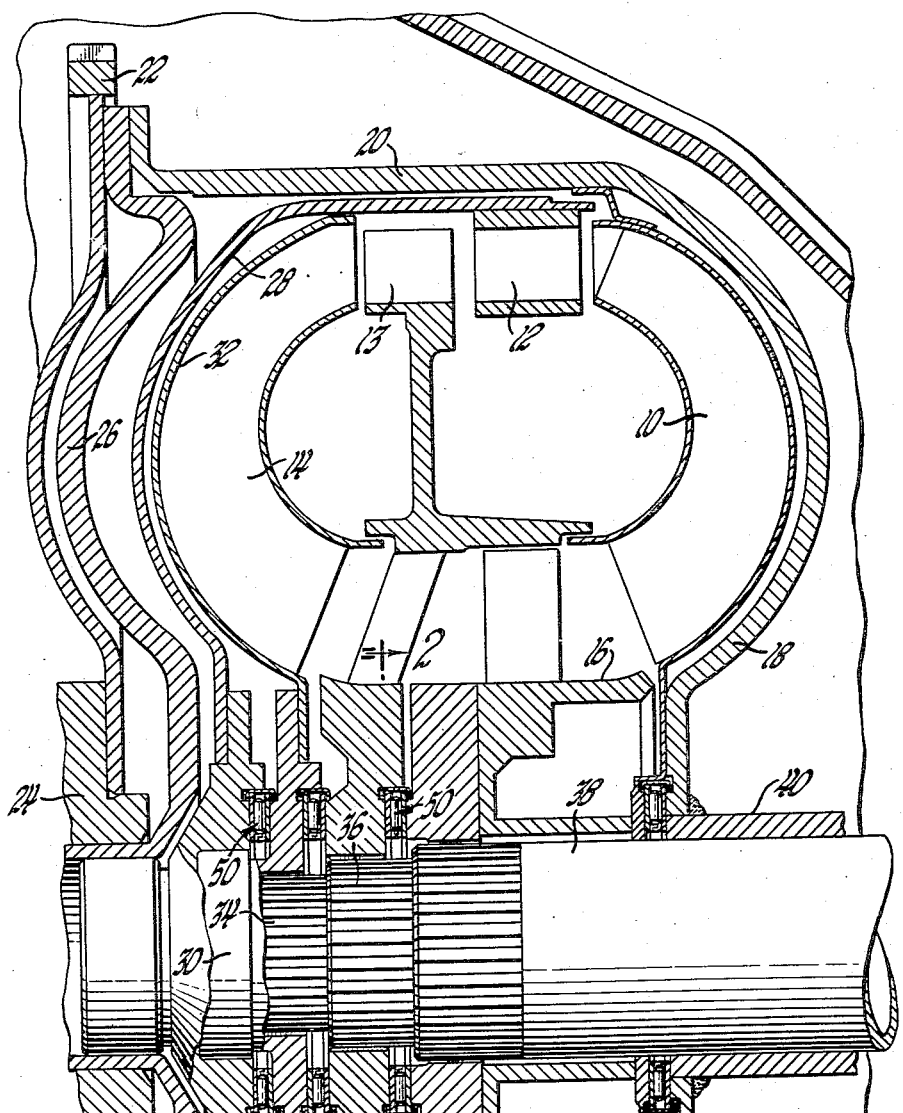
Fig. 1 is one-half of a symmetrical axial or longitudinal section of a hydrodynamic torque transmitting device embodying one form of the invention.

The torque transmitting device as shown in Fig. 1 may be a hydrodynamic torque converter having a bladed impeller 10, a plurality of bladed turbines 12, 13 and 14, and a bladed guide wheel, reaction member or stator 16. The impeller includes a toroidal shell 18 connected by a flange 20 forming part of the shell to a flywheel 22 driven by the crankshaft 24 of an engine. The turbines are enclosed within a shell 26 and the turbine 12 may have an inner shell 28 keyed to a drive shaft 30, while the turbine 14 may have a shell 32 keyed to a drive shaft 34. The turbine 13 may be keyed to a drive shaft 36 and the guide wheel may be connected through a one-way brake to a ground sleeve 38 fixed to the frame of the transmission. The drive shafts may be connected through any suitable gearing, not shown, to a common output shaft. The shells each have an opening in the center, which opening in the shell 18 may be surrounded by a tube 40 welded to the shell 18 and surrounding the aforementioned drive shafts and ground sleeve. The tube may be sealed to the ground sleeve by any suitable seal, not shown.

The impeller 10 including the shell 18, the turbine shells 28 and 32 and guide wheel 16 form a container in the shape of a torus which contains liquid which transmits torque from the impeller to the turbines and hence to the drive shafts when the impeller is rotated by the engine.

The structure so far described is known, and its particular form is immaterial to my invention. Such known devices operate satisfactorily within their inherent limitations, but have certain disadvantages. For example, the rotation of the body of liquid in the toroidal chamber is frequently at high speed, such as 4000 R. P. M. At such speeds centrifugal force produces a very great hydrostatic pressure in the chamber. It has been found that this pressure is sufficient to expand in the axial direction the various shells, such as 18, 28 and 32. This expansion (called ballooning) may move parts as much as a tenth of an inch and the force involved in the expansion produces thrust of high value between adjacent parts. As is known, the guide wheel 16 is sometimes stationary and sometimes rotates, while the turbines 12, 13 and 14 may be stationary while the impeller is rotating, or they may rotate at different speeds with respect to each other and to the impeller. It is unavoidable that heavy thrust and resultant friction between relatively rotating members is developed. In the past attempts have been made to take care of this friction by plain thrust bearings of the usual bearing materials, but such bearings have not been sufficiently durable, even when constantly lubricated, as occurs when the working liquid in the torque converter is oil. Because of limitations of space, such thrust bearings must be thin. Even known thin anti-friction thrust bearings have not proved adequately durable in service, and in many instances the spacing members customarily used to hold anti-friction rollers apart, have been ground away and destroyed in very brief periods of operation of the torque converter. Heretofore, this has precluded the use of known anti-friction thrust bearings.

One of the objects of my invention is to provide an improved thrust bearing which is very thin and is capable of sustaining heavy thrust loads and to provide a hydrodynamic torque transfer device including such bearings in order to eliminate some of the disadvantages resulting from heavy thrust and expansion of the shells in the torque transmitting devices heretofore known.

Another object is to provide a durable anti-friction thrust bearing in which means is provided for periodically equalizing the speeds of the various anti-friction rollers.

In accordance with my invention I provide a thrust bearing, generally denoted by 50 and constructed as shown in Figs. 2 to 5. This includes a large number of hardened thrust transmitting rollers 52 in the form of cylinders of uniform diameter. The cylinders are held by spacing means including a pair of perforated sheet metal washers 54 which are assembled and held together, for example, by crimping at 56 so that the cylinders project through the perforations on opposite sides of the spacing washers in the direction of principal axis of rotation. This assembly of rollers and spacers is placed between a pair of suitable thrust transmitting surfaces, which may be formed on the relatively rotatable parts of the torque converter. However, the materials of which the torque converter is made are not usually hard enough to act as a race over which the rollers can travel under load. Therefore, I prefer to assemble the rollers and spacers between a pair of hardened washers or thrust sustaining plates 58 and 59 and hold the bearing in assembled relationship by a cap having a cylindrical portion 60 extending parallel to the axis of rotation and adjacent the edges of the spacers 54 and washers 58, 59. The cap has radial flanges 62, at least one of which is formed after the bearing is assembled to hold all of the parts in assembled relationship. Preferably, the axial distance between the two flanges 62 is greater than the combined axial thickness of the rollers and washers so that a space 64 is left inside the assembled bearing to permit free relative rotation of all of the parts.

In Figs. 2 and 3 the cap is formed at the outside of the bearing assembly. Alternatively, I can form it inside, surrounding the central opening.

Previous attempts to use roller thrust bearings before my invention have not been successful. If the bearings are very thin, the diameter of the rollers is of the order of $\frac{1}{16}$ of an inch and this requires extremely thin spacing members. Also, since the bearings must be thin, I cannot use conical rollers and conical races, but must use cylindrical rollers and plane thrust surfaces. When cylindrical rollers travel in a circle on a plane surface some part of each roller must necessarily slide, because the ends of the roller being at different radial distances from the center of rotation must travel at different linear speeds. This unavoidable sliding creates other problems. For example, in the operation of the torque converter the surfaces of the thrust washers cannot be, or at least remain, mathematical planes; the surfaces of the rollers cannot be or remain mathematical cylinders and the diameters of the cylinders may vary slightly. Any or all of the above departures from pure mathematical surfaces and uniformity may occur due to unavoidable slight variations in manufacture; and variations may occur from time to time due to changes in forces, wear, and other causes. All this has the result that when the rollers are driven between a pair of thrust surfaces, one roller may rotate on its axis faster or slower than another roller. For example, one roller may be rotated about its axis, in effect, by a contact circle at the outer end of the roller, while the rest of the roller slides. This produces one speed of revolution of the roller about the major axis, or the shaft. At the same time another roller may be rotated about its axis, in effect, by a contact circle at the inner end of the roller, while the rest of the roller slides. This produces a different speed of revolution about the shaft. This difference of speed causes one roller to try to catch up with some other roller or fall behind it in the travel about the circular path. This in turn causes some rollers to bear against the edges of the perforations in the spacers, sometimes with great force. Examples have occurred in which, after a few miles of operation of an automobile having a torque converter equipped with bearings constructed as described above, bearings have failed. Sometimes when the torque converters have been taken apart no trace of the spacers remained.

I have discovered that the foregoing difficulty can be markedly reduced or entirely eliminated by providing one of the thrust surfaces with interruptions or depressions in the path of the rollers. For example, in carrying out my invention, I make one of the thrust washers 58 with at least one arcuate depression or interruption 70 in its face which bears against the rollers. Preferably, I provide three such depressions or interruptions of the surface 70, 71, 72 symmetrically arranged about the axis. Preferably also, each depression has radial edges 73 and the depressed surfaces slope gently to these edges as indicated at 74 in Figs. 2 and 4. The other bearing surface or thrust washer 59 is a plane. Such interruptions of bearing surface or depressions can readily be made by coining the washer before it is hardened.

This bearing operates as follows: The force which I have discovered that grinds away the spacers can only be maintained when several rollers are being firmly driven between two thrust surfaces urged toward each other under such circumstances that the thrust surfaces attempt to rotate the rollers about their own axes at different speeds. And I believe that the harmful contact between the rollers and the edges of the perforations occurs only when there are prolonged periods in which these different speeds exist. I believe this is due to the very small diameters of the rollers and to the clearance between the rollers and the edges of the perforations. In the bearing embodying my invention, whenever any roller comes opposite an interruption such as 70, it is no longer pressed between the surfaces, and so is no longer driven. This freedom from positive drive by the plane thrust surfaces periodically allows the rollers to equalize their speeds and removes or prevents the harmful, forceful contact between the rollers and edges of the perforations in the spacers previously encountered.

The radial disposition of the edges 73 of the perforations and the sloping surfaces 74 prevents damage to the rollers and thrust washers as the rollers pass over these edges. During the periods when any roller, such as 80, in Fig. 4 is opposite a depression, the thrust of the bearing is taken by all the remaining rollers 82 which are in contact with both plates 58, 59. These remaining rollers, together with the spacers, support the rollers 80 so that they cannot touch both plates. I find that where this is done once or several times during each revolution the durability of the bearing is brought within practical limits.

Each bearing can be assembled in the order indicated in Fig. 5 in which the cap 60 has only one of its flanges 62 formed. After all the parts are assembled within the cap, the other flange 62 shown in Fig. 3 is formed in any suitable known manner.

I claim:

1. A thrust bearing comprising in combination a plurality of cylindrical thrust transmitting rollers, rotatable spacing means supporting the rollers for revolution about a principal axis and with the individual axes of the rollers disposed in the same plane, the cylindrical surfaces of the rollers projecting beyond both sides of the spacing means in the direction of the principal axis, a pair of thrust receiving plates adapted to contact the cylindrical surfaces of the rollers on opposite sides of the rollers whereby in revolving about the principal axis, each roller rolls in contact with both plates and the several rollers rotate on their individual axes at varying speeds due to differences in the radial distances from the principal axis of the determining contact circles of the individual rollers with the plates, and means for holding the plates, rollers and spacing means in assembled relation, one of the plates having an uninterrupted plane surface adjacent the rollers and the other plate having a plane surface having at least one interruption adjacent the rollers, the interruption having radially disposed edges and being in the path of the surfaces of the rollers whereby each roller in travelling about the axis is periodically supported out of contact with one plate by a plurality of rollers in contact with both plates.

2. A thrust bearing comprising in combination a plurality of cylindrical thrust transmitting rollers, rotatable spacing means supporting the rollers for revolution about a principal axis and with the individual axes of the rollers disposed in the same plane, the cylindrical surfaces of the rollers projecting beyond both sides of the spacing means in the direction of the principal axis, a pair of thrust receiving plates adapted to contact the cylindrical surfaces of the rollers on opposite sides of the rollers whereby in revolving about the principal axis, each roller rolls in contact with both plates and the several rollers rotate on their individual axes at varying speeds due to differences in the radial distances from the principal axis of the determining contact circles of the individual rollers with the plates, and means for holding the plates, rollers and spacing means in assembled relation, one of the plates having an uninterrupted plane surface adjacent the rollers and the other plate having a plane surface having at least one interruption adjacent the rollers, the interruption having radially disposed edges and being in the path of the surfaces of the rollers whereby each roller in travelling about the axis is periodically supported out of contact with one plate by a plurality of rollers in contact with both plates, said plate having the interruption also having a sloping surface joining its plane surface along said radially disposed edge.

References Cited in the file of this patent

UNITED STATES PATENTS

| | | |
|---|---|---|
| 774,893 | Riebe | Nov. 15, 1904 |
| 1,994,996 | Horrocks | Mar. 19, 1935 |
| 2,173,508 | Horrocks | Sept. 19, 1939 |
| 2,658,346 | Seybold | Nov. 10, 1953 |
| 2,726,906 | Winchell | Dec. 13, 1955 |